US011576249B2

(12) United States Patent
Gonzales et al.

(10) Patent No.: US 11,576,249 B2
(45) Date of Patent: Feb. 7, 2023

(54) DEVICE FOR APPLYING BEAMFORMING SIGNAL PROCESSING TO RF MODULATED X-RAYS

(71) Applicant: MICRO-X LIMITED, Tonsley (AU)

(72) Inventors: Brian Gonzales, Tonsley (AU); Robert C. Sheehy, Tonsley (AU)

(73) Assignee: MICRO-X LIMITED, Tonsley (AU)

( * ) Notice: Subject to any disclaimer, the term of this patent is extended or adjusted under 35 U.S.C. 154(b) by 0 days.

(21) Appl. No.: 17/057,026

(22) PCT Filed: Nov. 28, 2018

(86) PCT No.: PCT/AU2018/000237
§ 371 (c)(1),
(2) Date: Nov. 19, 2020

(87) PCT Pub. No.: WO2019/222786
PCT Pub. Date: Nov. 28, 2019

(65) Prior Publication Data
US 2021/0212189 A1 Jul. 8, 2021

(30) Foreign Application Priority Data
May 25, 2018 (AU) ................................ 2018901828

(51) Int. Cl.
*H05G 1/32* (2006.01)
*H01J 35/06* (2006.01)
(Continued)

(52) U.S. Cl.
CPC ............. *H05G 1/32* (2013.01); *H01J 35/065* (2013.01); *H05G 1/70* (2013.01); *H05G 1/085* (2013.01); *H05G 1/52* (2013.01)

(58) Field of Classification Search
CPC .. H05G 1/32; H05G 1/70; H05G 1/52; H05G 1/085; H01J 35/065
See application file for complete search history.

(56) References Cited

U.S. PATENT DOCUMENTS 6,277,318 B1 8/2001 Bower et al.
6,553,096 B1 4/2003 Zhou et al.
(Continued)

FOREIGN PATENT DOCUMENTS

DE 3605735 A1 10/1986
DE 10 2014 226048 A1 9/2015
(Continued)

*Primary Examiner* — Chih-Cheng Kao
(74) *Attorney, Agent, or Firm* — Seed Intellectual Property Law Group LLP

(57) ABSTRACT

A device and method for creating beam formed X-Ray radiation using radio frequency (RF) modulated field emission X-ray sources is described. A radio frequency RF source generates a RF control signal which is supplied to an array of phase delay elements to generate multiple individually controlled phase delayed RF signals. These are then directly provided to each of a plurality of field emission sources (via a matching circuit) to generate a plurality of RF modulated electron current, or beam, each at the same frequency and phase delay of the phase delayed RF signals. Each of the electron beams impacts a target anode to generate X-rays also at the same frequency and phase delay of the phase delayed RF signals. By controlling each of the phase delay elements a beamformed X-ray radiation pattern can be generated.

30 Claims, 8 Drawing Sheets

(51) Int. Cl.

*H05G 1/70* (2006.01)
*H05G 1/08* (2006.01)
*H05G 1/52* (2006.01)

(56) References Cited

U.S. PATENT DOCUMENTS

| | | | | |
|---|---|---|---|---|
| 6,630,772 | B1 | 10/2003 | Bower et al. | |
| 6,787,122 | B2 | 9/2004 | Zhou | |
| 6,850,595 | B2 | 2/2005 | Zhou et al. | |
| 6,876,724 | B2 | 4/2005 | Zhou et al. | |
| 6,965,199 | B2 | 11/2005 | Stoner et al. | |
| 6,969,690 | B2 | 11/2005 | Zhou et al. | |
| 6,980,627 | B2 | 12/2005 | Qiu et al. | |
| 7,085,351 | B2 | 8/2006 | Lu et al. | |
| 7,252,749 | B2 | 8/2007 | Zhou et al. | |
| 7,294,248 | B2 | 11/2007 | Gao | |
| 7,359,484 | B2 | 4/2008 | Qiu et al. | |
| 7,455,757 | B2 | 11/2008 | Oh et al. | |
| 7,618,300 | B2 | 11/2009 | Liu et al. | |
| 7,751,528 | B2 | 7/2010 | Zhou et al. | |
| 7,850,874 | B2 | 12/2010 | Lu et al. | |
| 8,002,958 | B2 | 8/2011 | Zhou et al. | |
| 8,111,808 | B1 * | 2/2012 | Wood | G01V 5/0025 378/87 |
| 8,447,013 | B2 | 5/2013 | Sprenger et al. | |
| 8,842,806 | B2 | 9/2014 | Packard et al. | |
| 9,552,955 | B2 | 1/2017 | Beckmann et al. | |
| 2003/0052612 | A1 | 3/2003 | Tanabe | |
| 2005/0105690 | A1 | 5/2005 | Pau et al. | |
| 2009/0041198 | A1 | 2/2009 | Price et al. | |
| 2009/0232270 | A1 * | 9/2009 | Okunuki | A61B 6/405 378/5 |
| 2014/0133628 | A1 | 5/2014 | Utsumi et al. | |
| 2014/0353397 | A1 | 12/2014 | Velásquez-Garcia et al. | |
| 2015/0139386 | A1 * | 5/2015 | Star-Lack | G01V 5/0041 378/57 |
| 2016/0070021 | A1 * | 3/2016 | Pauly | G01N 23/203 378/87 |
| 2020/0163196 | A1 * | 5/2020 | Gonzales | H01J 35/065 |

FOREIGN PATENT DOCUMENTS

| | | | |
|---|---|---|---|
| EP | 1 995 757 | B1 | 6/2013 |
| WO | 2011/035963 | A1 | 3/2011 |
| WO | 2014/125389 | A1 | 8/2014 |
| WO | 2017/213996 | A1 | 12/2017 |

* cited by examiner

DEVICE FOR APPLYING BEAMFORMING SIGNAL PROCESSING TO RF MODULATED X-RAYS

PRIORITY DOCUMENTS

The present application claims priority from Australian Provisional Patent Application No. 2018901828 titled "A Device for Applying Beamforming Signal Processing to RF Modulated X-Rays" and filed on 25 May 2018, the content of which is hereby incorporated by reference in its entirety.

TECHNICAL FIELD

The present invention relates generally to devices for producing X-ray radiation, and in particular to devices producing radio frequency modulated X-ray radiation using a vacuum tube with a field emission electron source.

BACKGROUND

Conventional X-ray radiation sources use thermionic emission from a heated cathode as the electron source used to generate X-rays; this thermionic emission resulting either directly from a hot filament or a filament heated cathode electrode. These devices release electron flux that is a function of the cathode source temperature and the applied electric field appearing adjacent to the cathode from the anode and other electrodes in the vacuum tube such as the focus and grid electrodes. The electron beam is accelerated towards a heavy metal target anode, and the impact generates a broad spectrum of X-rays limited to the peak energy the electrons are accelerated to. Mechanical collimators are then used to direct the X-rays towards and through an object.

Conventional X-ray sources produce a continuous dose or flux of X-ray radiation, and have thus been used for a variety of imaging applications including conventional projection radiography, computed tomography, tomosynthesis, phase contrast imaging, and backscatter imaging. In conventional projection radiography, computed tomography, and tomosynthesis, the x-ray measurement is based on the change in the intensity of the X-rays as they move through the target. In computed tomography and tomosynthesis an X-Ray source is rotated around an object and the slices are reconstructed to generate a three dimensional image. In phase contrast imaging, spatial domain phase offsets at the X-ray wavelengths are measured, for example by spatially moving the detector or using gratings in the detector; this measurement is technical challenging due to the small wavelength of X-rays In all these applications the X-ray radiation is considered fixed (i.e. constant flux through the object for a given period).

Backscatter X-ray imaging techniques measures backscattered X-rays of a target, rather than those passing through as in projection radiography. Recently a backscatter based X-Ray RADAR has been developed. In this system a single thermionic source (i.e. heated filament) generates an electron beam which is then modulated using a klystron and focused onto a single focus point on the anode target. In this device, a receiver at an RF frequency tracks the modulation and the phase delay in the backscattered X-ray radiation to identify the depth of the backscattering event. However a significant disadvantage of this system is that it requires a large vacuum system to operate the Klystron and complex electronics to control it.

One problem with conventional X-ray sources is the limited ability to control or focus the X-rays outside of a vacuum tube, as the direction is limited by the ability to physically locate the collimators and the fact that the X-ray radiation will naturally spread out from the end of the collimator. The limitation of directional control of X-ray radiation thus makes it challenging to consolidate (or tightly focus) X-ray radiation within a small region inside of an object to provide improved imaging or radiation therapies.

More recently field emission X-ray radiation sources have been developed. Field emission based X-ray sources generate X-rays in the same way as conventional X-rays but produce the electrons by applying a high electric field over a conductor surface instead of using a thermionic emitter. The electron flux is a function of the conductor used, the size and shape of the conductor surface, and the intensity of the electric field. For the same conductor, the electron flux intensity is directly proportional to the intensity of the electric field (once above the critical field turn-on threshold). This electric field is typically created by applying a voltage potential over the surface of the conductor. By rapidly applying a voltage potential over the conductor surface, a corresponding precise electron flux is created simultaneously with the establishment of the field. This property has been used in field emission based X-ray sources to create short precisely controlled X-ray pulses used for high speed X-ray imaging.

Field emission X-ray radiation sources do not require heat to generate an electron flux and are commonly referred to as cold cathode sources. The reduced heat load enables close placement of multiple electron sources within a single vacuum envelope. Each electron source can be designed to be isolated, both electrically and thermally, from its neighbours and independently controlled. An individually controllable distribution of field emission electron sources has been used to create an X-ray radiation source with a distribution of focal spots, referred to as a multibeam tube.

Multibeam tubes have applications in tomosynthesis, computed tomography, and lightweight backscatter. Multibeam tubes have also been used in multi-focal point multiplexing to increase image resolution. In all current applications, multibeam tubes are used to creating sets of x-ray images using a fixed x-ray dose resulting from fixed electron flux amplitude for a specified period. In tomosynthesis applications, variations in flux are considered noise and sources are designed to keep the amplitude of electron flux stable.

Carbon nanotubes (CNTs) have recently been developed for use as multibeam cold-cathode sources. Due to their large aspect ratios and thermal and conductive stability, CNTs make ideal field emitters. Recent applications of CNT based multi-beam X-ray tubes to tomographic imaging systems have demonstrated significant improvement in image quality and increased flexibility in system design.

CNT multibeam tubes generate a spatially distributed array of individually controllable X-ray focal spots within a single vacuum tube. By sequentially scanning each focal spot, a tomographic scan of an imaged object is acquired with no movement of the source. Generating a tomographic scan without moving the X-ray source removes motion induced blurring, resulting in increased resolution in the reconstructed images. The spatial distribution of X-ray focal spots within the multibeam tube determines the geometry of the tomographic scan, as compared to the physical rotation of an X-ray source.

It would be desirable to provide a method where the X-ray radiation is directed through the irradiated object with a greater degree of control than is possible with a mechanical collimator. Applications where improved directionality of X-ray radiation may include higher resolution X-ray imaging and radiation therapy.

It would be also be desirable to provide a method where the dose of X-ray radiation is consolidated within a small region of an object while limiting the dose away from that region. While it may not be possible to restrict dose away from the target region, it would be desirable to ensure that the ratio of dose in the small region to that outside it is large enough to enable imaging of that small region or to prevent a damaging dose in regions not in that location.

Applications where applying a consolidated dose to a small region may include imaging the X-ray scatter emanating from the region, using the location of the dose to do localized inverse computed tomography, and applying radiation therapy to address cancerous tissue.

There is thus a need to provide an X-ray source apparatus with improved ability to directionally control the X-ray direction, or to at least provide a useful alternative to existing systems.

SUMMARY

According to a first aspect, there is provided an X-ray radiation beamforming apparatus, comprising:

at least three field emission electron sources and one or more associated electrode structures housed in one or more vacuum enclosures;

a radiofrequency (RF) source and an RF controller configured to produce a plurality of individually controlled phase delayed RF signals;

an RF matching circuit configured to match each of the at least three field emission electron sources with one of the plurality of individually controlled phase delayed signals to generate a plurality of RF modulated electron currents at the same frequency and phase delay of each of the plurality of phase delayed RF signals;

one or more target anodes housed in the one or more vacuum enclosures, wherein a voltage potential between the one or more target anodes and the at least three field emission electron sources accelerates the plurality of RF modulated electron currents to generate RF modulated X-ray radiation at the same frequency and phase delay of each of the plurality of phase delayed RF signals, and wherein the RF controller is configured to produce a plurality of individually controlled phase delayed signals to implement a predefined beamforming radiation pattern.

In some embodiments, a frequency of the RF source is at least 100 MHz.

In some embodiments, the frequency of the RF source is at least 1 GHz.

In some embodiments, the at least three field emission electron sources are spaced apart at a spacing of less than a quarter wavelength of the RF source.

In some embodiments, the predefined beamforming radiation pattern is a narrow X-ray wavefront travelling through space.

In some embodiments, the predefined beamforming radiation pattern focuses the X-ray radiation to a single spatial location.

In some embodiments, the RF source and the RF controller comprises an RF source configured to supply an RF control signal to an array of phase delay elements, and the controller implement the predefined beamforming radiation pattern by controlling the operation of the RF source and the array of phase delay elements. In some embodiments, the phase delay elements are fixed phase delay elements. In some embodiments, the phase delay elements are variable phase delay elements.

In some embodiments, the RF controller further comprises:

a pulse generator for modulating the RF control signal with a pulse to create a single-peak wavefront or a single-peak focal point travelling through space.

In some embodiments, the RF source and RF controller is configured to produce the plurality of individually controlled phase delayed RF signals by using a plurality of individually controlled phase delay circuits.

In some embodiments, the RF source and RF controller is configured to produce the plurality of individually controlled phase delayed RF signals by using a plurality of phase delay paths.

In some embodiments, the at least three field emission electron sources are arranged in an array such that the spacing between each individual field emission sources have a set phase shift along the array.

In some embodiments, the one or more targets comprises at least three target anodes wherein there is a 1 to 1 mapping of a field emission electron source to a target anode, and the at least three target anodes are arranged in an array to generate as an array of at least three RF modulated X-ray radiation sources.

In some embodiments, the at least three field emission electron sources are arranged as a linear spaced array.

In some embodiments, the at least three field emission electron sources are arranged as a non-linear biased spaced array where the bias is related to the wavelength of the modulating RF control signal.

In some embodiments, the at least three field emission electron sources are arranged as multiple sets of arrays. In some embodiments, each set is arranged as a linear spaced array. In some embodiments, each set is arranged as a non-linear biased spaced array where the bias is related to the wavelength of the modulating RF control signal.

In some embodiments, the at least three field emission electron sources are arranged as an array within a single vacuum enclosure configured as a single multibeam field emission X-ray tube that generates multiple RF modulated X-ray radiation sources.

In some embodiments, the at least three field emission electron sources are each in at least three separate vacuum enclosures arranged in an array, and each configured as single RF modulated X-ray radiation source.

In some embodiments, the at least three field emission electron sources are arranged as an array of multibeam field emission X-ray tubes that generate multiple RF X-ray sources and each comprising a single vacuum enclosure housing an array of multiple field emission sources that each generate multiple RF modulated X-ray radiation sources.

According to a second aspect, there is provided a method for generating beamformed X-ray radiation, the method comprising:

generating a plurality of individually controlled phase delayed radiofrequency (RF) signals from a RF source and a RF controller;

applying each of the individually controlled phase delayed signals to each of at least three field emission electron sources using an RF matching circuit to generate a plurality of RF modulated electron currents at the same frequency and phase delay of each of the plurality of phase delayed RF signals;

accelerating the plurality of RF modulated electron currents towards one or more target anodes by applying a voltage potential between the one or more target anodes and the at least three field emission electron sources to generate RF modulated X-ray radiation at the same frequency and phase delay of each of the plurality of phase delayed RF signals, wherein the RF controller is configured to generate the plurality of individually controlled phase delayed RF signals to implement a predefined beamfonning radiation pattern.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1A:
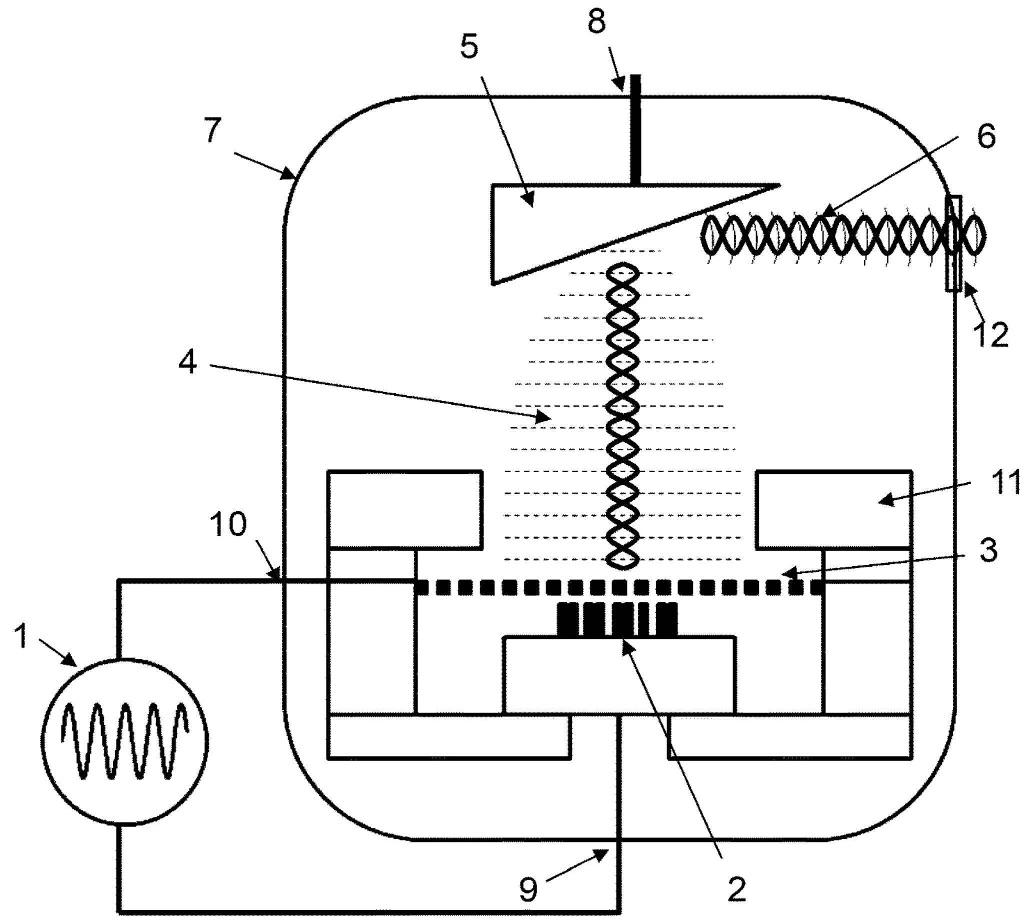
FIG. 1A is a schematic diagram showing a field emission RF X-ray radiation source in a field emission X-ray tube electrode structure.

Embodiments of a device (or apparatus) will now be described in which a set of field emission X-ray sources are configured as a distributed array of RF X-Ray transmitters and beamforming signal processing is applied to this array. The beamforming signal processing can be used to create and steer narrow X-ray wave fronts through the space in front of the array. Similar signal processing can also be used to create and steer a focused X-ray point through space. In both cases, a Gaussian, Nyquist or other suitable pulse can be convolved with the input RF signal to provide additional depth information to the RF X-Ray signal.

X-ray radiation is typically generated by accelerating free electrons in a vacuum and smashing these electrons into a heavy metal. The free electrons are accelerated to an energy defined by a voltage potential difference, typically between 40 kilovolts and 120 kilovolts for medical applications, between 140 kilovolts and 160 kilovolts for security applications, and between 75 kilovolts and 600 kilovolts for non-destructive testing. The electrons have an energy equivalent to the tube voltage when they reach the heavy metal surface. As these high energy electrons interact with the electrons in the heavy metal, they lose their energy and radiate X-rays. The X-rays are radiated as a broad spectrum of X-ray wavelengths limited by the peak energy to which the electrons have been accelerated. The intensity of the of spectrum of X-ray radiation corresponds to the number of free electrons accelerated into the heavy metal; as the electron flux increases the X-ray radiation intensity increases across the entire wavelength spectrum.

Field emission based electron sources generate X-rays in the same way as conventional thermionic electron sources but produce the electrons by applying a high electric field over a conductor surface instead of using a thermionic emitter. The electron flux is a function of the conductor used, the size and shape of the conductor surface, and the intensity of the electric field. For the same conductor, the flux intensity is directly proportional to the intensity of the electric field once above the critical field threshold. This electric field is typically created by applying a voltage potential over the surface of the conductor. By rapidly applying a voltage potential over the conductor surface, a corresponding precise electron flux is created simultaneously with the establishment of the field. This property is used in field emission based X-ray sources to create short precisely controlled x-ray pulses used for high speed x-ray imaging.

X-ray radiation is a form of electromagnetic radiation, and thus exhibits wave properties. However to date there has been limited use of the wave properties of X-rays, and those systems which do (eg X-ray phase imaging, and the proposed X-ray backscatter RADAR system) are large, complex and highly specialised in application. It has been realised by the inventors that by using field emission sources, and modulating X-rays with a lower frequency (eg Radio Frequencies), the wave properties of the lower frequency can be used together with conventional X-ray imaging. The resulting signal provides a mix of information from samples in the two distinct regions of the electromagnetic spectrum. Further the use of RF modulation directly at the field emission source enables the use of beamforming techniques to efficiently and simply create desired X-ray radiation patterns for a range of applications.

The use of field emission electron sources overcomes a significant limitation of thermionic sources which have a relatively low bandwidth frequency response as a result of baseline cathode emission. Applying a modulation of voltage to the cathode-grid voltage produces a modulation of the electron beam current, but the amplitude swing without distortion is limited by the minimum electric field to cause electrons to leave the cathode at one end and the maximum cathode current limited by the temperature on the cathode. To increase the level of amplitude swing and the maximum modulation frequency, ideally the cathode baseline emission needs to follow the demand, which is not possible with a thermionic source due to the thermal time lag of the filament mass. Thus in the previous X-Ray RADAR system, the electron source is a constant flux thermionic source, and so requires a large and complicated Klystron arrangement to modulate the electron beam, and then a synchronised detector is required to detect the backscatter radiation.

In contrast field emission electron sources use electric fields from a voltage potential over a conducting surface to extract an electron flux. The change in electron flux generated by field emission sources follows a change in applied voltage potential between the electron source and reference electrode. The electron flux amplitude thus directly follows changes in the voltage potential without any lag; thus, these sources have a very high frequency bandwidth. Thus, and as will be described below, by directly modulating the electric fields used to generate the electron beam directly with an RF frequency, beamforming applications can be enabled.

In the field of signal processing, beamforming is used to form, steer, and/or focus a transmitted radio frequency signal, a sonar signal, or an ultrasound signal. Beamforming is the use of phase offsets sent to or received from a distribution of transmitting or receiving signal elements to spatially filter a spatially or time varying signal. The phase offset may be in the spatial or time domain. The accuracy and range of the spatial filtering is related to the number of signal elements transmitting or receiving. The signal-to-noise (SNR) of a signal beam or focal spot is increased as the number of elements increases.

In FIG. 1A, a time varying sinusoidal voltage 1 is applied to between a field emission cathode 2 and excitation electrode 10 in the form of a grid 3. The field emission cathode comprises a plurality of field emission sources on a cathode structure. The input voltage 1 creates a time varying sinusoidal electric field between the field emitter cathode 2 and the grid 3. The varying electric field draws electrons from the field emitter sources 2 proportional to the field intensity resulting in a time varying sinusoidal electron current 4. The varying voltage lean be applied as a high frequency radio frequency (RF) signal and may be generated using a RF source and RF controller apparatus with an RF impedance matching and coupling circuit (referred to as a RF matching circuit) that couples and matches an RF control signal from the RF source to the cathode-grid electrode structure. This RF signal will be transformed into an electron signal with the same RF frequency 4. Thus, the field emission sources and electrode structure enables a direct transformation of a RF input signal to a RF modulated electron current.

The time varying RF modulated electron current 4 is accelerated through a constant high voltage potential into a heavy metal anode 5. The electron current 4 may also be referred to as an electron beam. As the electrons impact in the anode material, x-rays 6 are produced proportional to the electron current flux. The x-ray signal intensity follows the electron current intensity and a time varying sinusoidal X-ray signal 6 is produced. If the time varying input signal is an RF signal 1, the X-ray signal becomes an RF modulated X-ray signal 6.

The field emission cathode and anode are enclosed within a vacuum enclosure 7; where the enclosure has the appropriate high voltage vacuum feedthroughs for the anode 8, cathode 9, and excitation electrode grid 10, and appropriate RF vacuum feedthroughs for the RF signal(s). A focusing electrode or focusing cup 11 may be used to focus the modulated electron current 4 onto the anode 5. The modulated X-ray signal 6 may be passed through the vacuum enclosure through a window 12.

The RF signal is generated using an RF source and RF controller located outside of the vacuum enclosure and that supplies an RF signal to an RF impedance matching and coupling circuit (which we will refer to as an RF matching circuit) which may be within or external to the vacuum housing. The RF matching circuit is designed so that the high voltage bias voltage is not applied to the RF source and the RF input impedance of the X-ray tube is matched to the RF source impedance for maximum power transfer and low phase distortion.

In one embodiment, the RF matching circuit is enclosed within an extension of the vacuum enclosure (or housing) 7 and separate vacuum feedthrough connections are provided for the high voltage bias source and RF signal source. This enables the RF matching circuit and high voltage bias electrode to be integrated with the field emission cathode via one or more vertical interconnects on a ceramic or silicon substrate. In this way the RF matching circuit can be integrated into the field emission source 2. In another embodiment the RF matching circuit is external to the vacuum vessel 7 and uses an RF vacuum feedthrough connection to connect to the vacuum vessel 7. In this embodiment, an RF enclosure encloses the field emission cathode electrode 2 but not the RF matching circuit. In one embodiment the RF impedance matching circuit is formed from discrete components or RF microstrip, stripline or coplanar waveguide techniques (eg quarter wave transformers) on a printed circuit board that mounts to the vacuum vessel 7 with standoffs. In some embodiments the RF vacuum feedthrough connection connecting the RF matching circuit to the field emission cathode electrode 2 is shielded with RF shielding to reduce spurious signal interference.

Figure 1B:
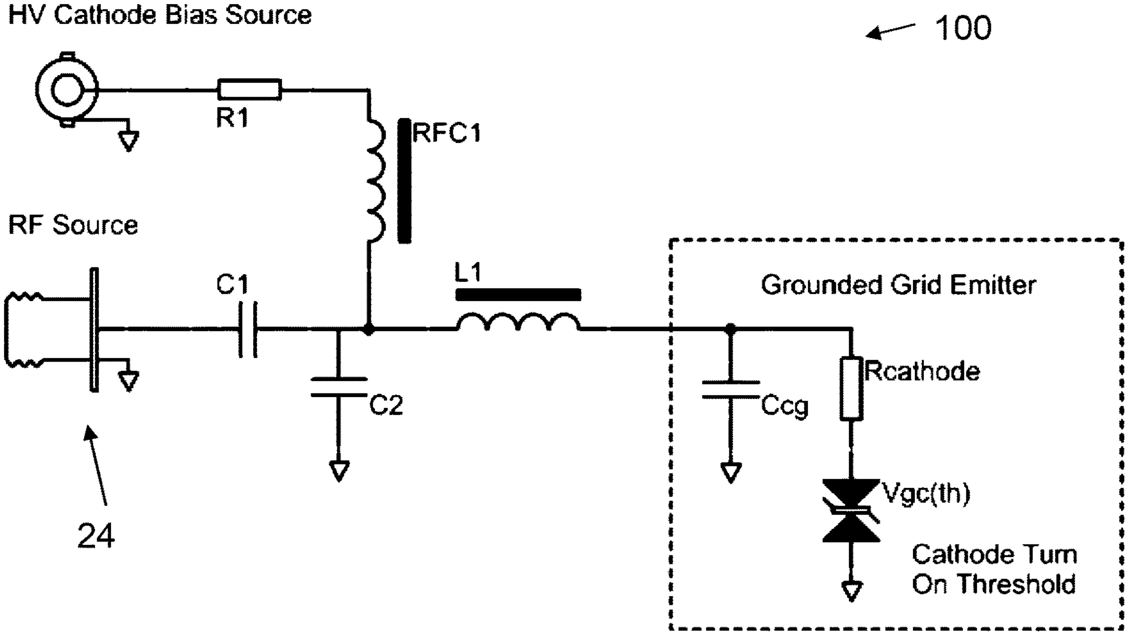
FIG. 1B is a schematic circuit diagram of an RF impedance matching and coupling circuit according to an embodiment.

FIG. 1B is a schematic circuit diagram of an embodiment of a RF impedance matching and coupling circuit 105 using lumped elements for a grounded grid electrode version of the RF X-ray tube. The cathode emitter appears in this figure as a combination of a shunt vacuum capacitance Ccg, and a blocking voltage Vgc(th) with an effective series resistance Rcathode. In order to maximize RF power supplied to the emitter, the load impedance of the cathode emitter is transformed to match the RF source impedance by the matching elements L1 and C2. The RF source 24 is AC coupled to the matching network via a high voltage RF capacitor C1. The low frequency or DC bias current and voltage is applied to the network via a current limiting resistor R1 and an RF blocking inductor RFC1 so that the RF signal is prevented from flowing to the bias source.

Figure 1C:
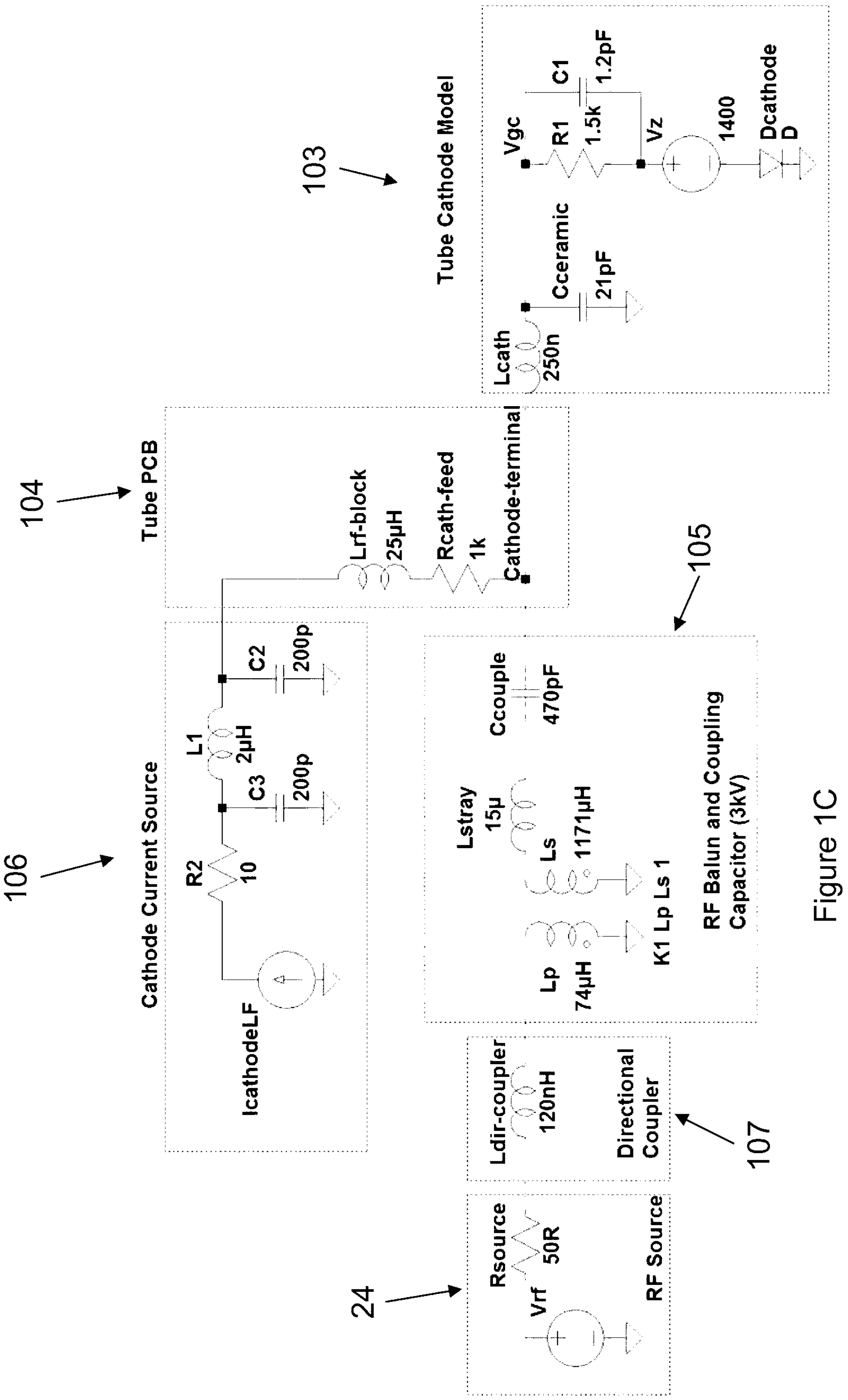
FIG. 1C shows a circuit diagram for operation of an X-ray tube according to an embodiment.

FIG. 1C shows a circuit diagram for operation of an X-ray tube according to an embodiment. In this embodiment X-ray tube 103 is controlled via X-ray PCB control board 104 which is driven by cathode current source 106 and an RF source 24. The RF matching and coupling circuit 105 allows RF power to be added in parallel to the X-ray tube current source 106. In this embodiment, the RF matching and coupling circuit 105 is added outside of the vacuum enclosure 7 and composed of discrete components. Additionally a bidirectional coupler 107 between the RF power source 108 and the RF impedance matching and coupling circuit 105 is also shown which was included to allow a measurement of the forward RF signal and the reflected RF signal for the plot shown in FIG. 2A (discussed below). In this embodiment the RF coupling circuit block 105 is a RF Balun and Coupling capacitor (3 kV) circuit and consists of a 1:4 bifilar wound RF transformer on 2× toroidal cores and a high voltage 470 pF ceramic disc capacitor. A 25 uH RF inductor is added in series to a 1 kOhm resistor. The parasitic inductance of the loop formed by the transformer wiring, ceramic coupling capacitor, cathode feed-through and the ground return inductance from the grid mesh to the RF ground terminal is estimated to be between 250 nH and 500 nH. The RF impedance matching and coupling circuit 105 covers a frequency window from 1 MHz to 30 MHz.

Figure 1D:
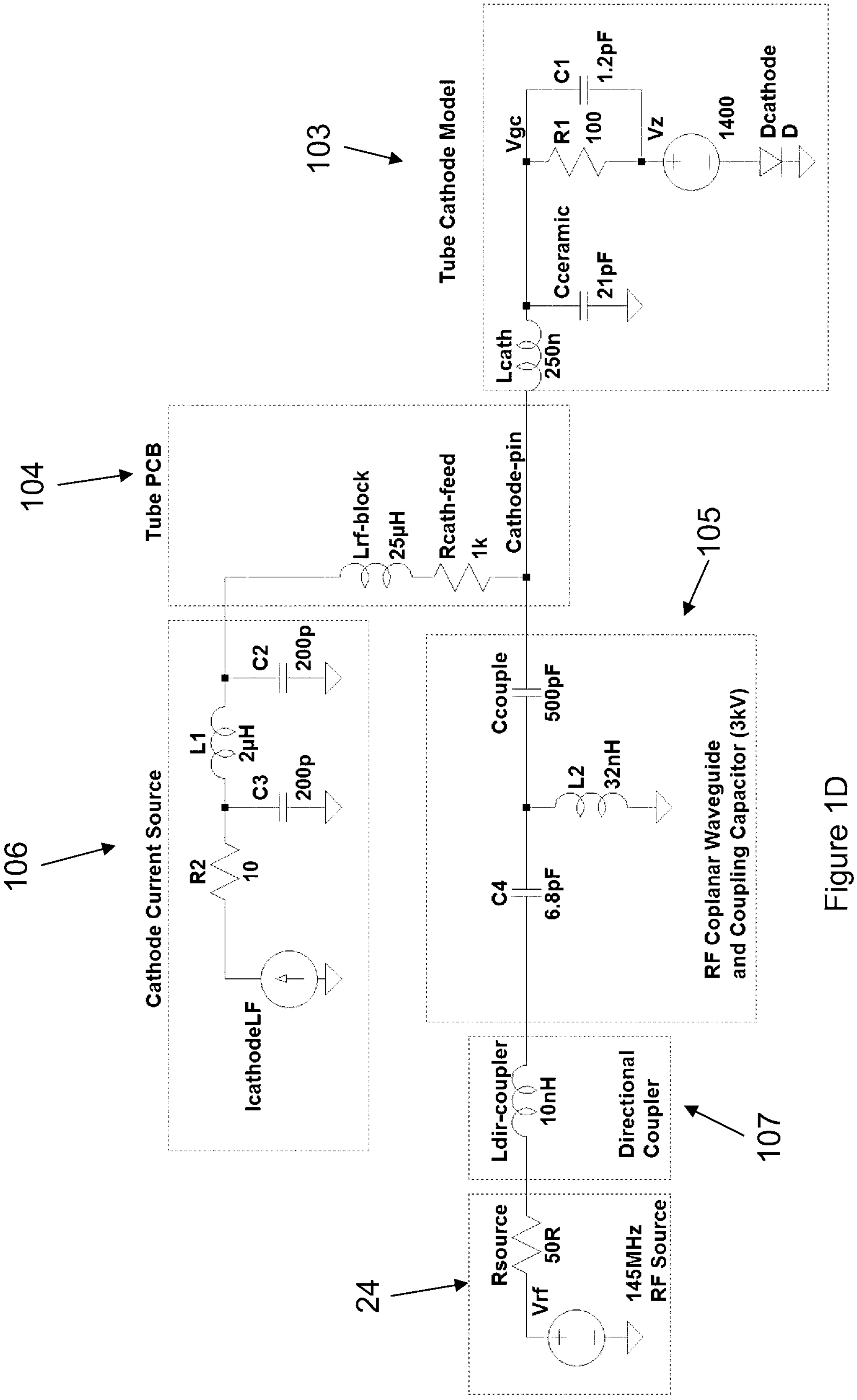
FIG. 1D shows a circuit diagram for operation of an X-ray tube according to another embodiment.

FIG. 1D shows a similar circuit diagram to FIG. 1C, but with an alternative RF matching and coupling circuit 105. In this embodiment the RF matching and coupling circuit 105 is a RF Coplanar waveguide and coupling capacitor (3 kV) circuit which has been designed for an operating frequency around 145 MHz. This features a waveguide represented by 6.8 pF capacitor and 32 nH inductor, followed by a 500 pF coupling capacitor. Similar impedance matching and coupling circuits 105 can be designed and implemented depending upon the RF source frequency.

A complete description of a device for generating RF modulated x-ray radiation can be found in PCT Application Number PCT/AU2018/000078 filed on 25 May 2018 and titled "Device for producing Radio Frequency Modulated X-Ray Radiation", the entire content of which is hereby incorporated by reference.

In the context of the specification a field emission source will be considered to generate a single electron beam (or current). Each field emission source comprises a plurality of individual field emitters on a substrate material, which typically will also be the cathode. The field emitters include carbon nanotube field emitters (CNTs, including both single walled and multi-walled CNTs), nanostructured diamond, nanowires, and other nanostructured electron generating materials (ceramics, semiconductors, metal and non-metal sulfides, etc). The field emission sources each have an associated electrode structure comprising a cathode 2, grid 10, and focusing electrode 11 (if present) which is driven by an individually controlled input signal to generate an electron beam (or electron current) from the field emitters towards the anode.

Figure 2A:
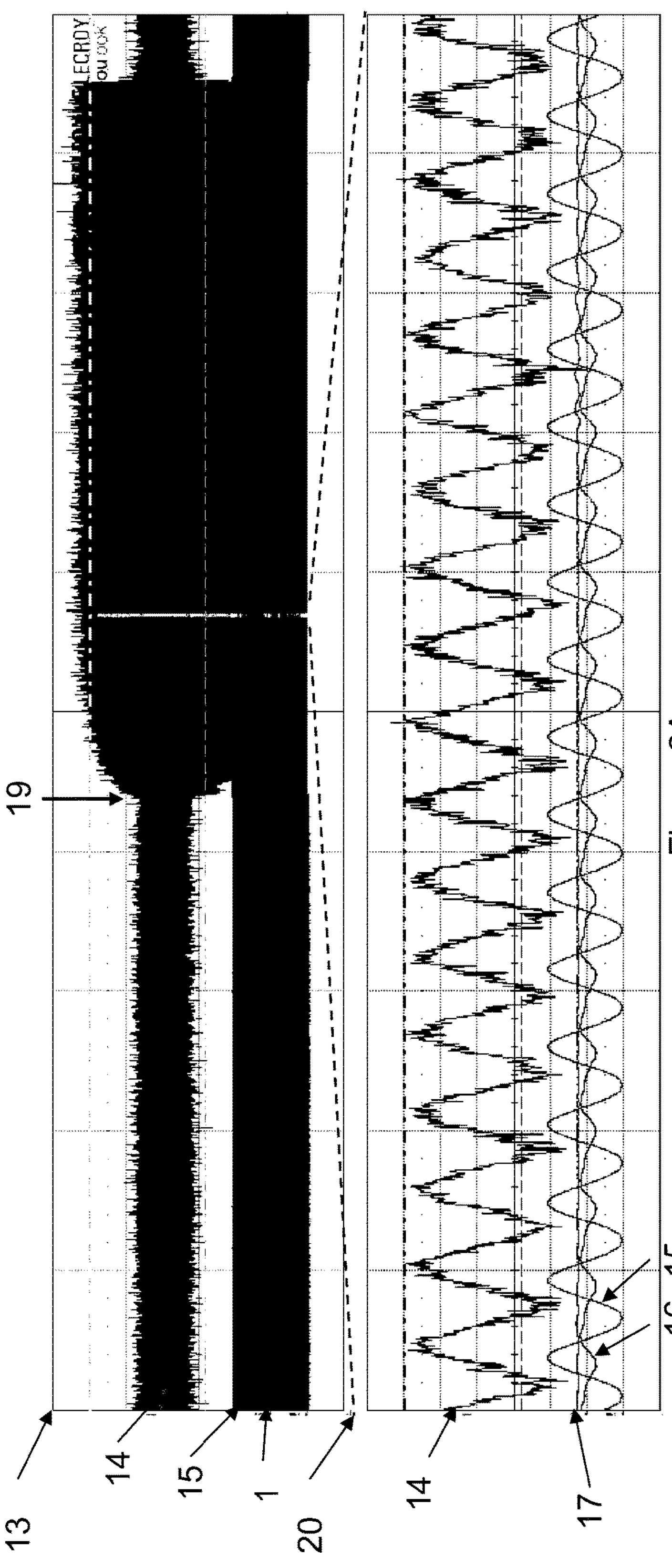
FIG. 2 is a measurement from an MCP X-ray detector of RF modulated x-ray radiation at 3.6 MHz and corresponding X-ray dose measurement. From an RF modulated x-ray tube.
Figure 2B:
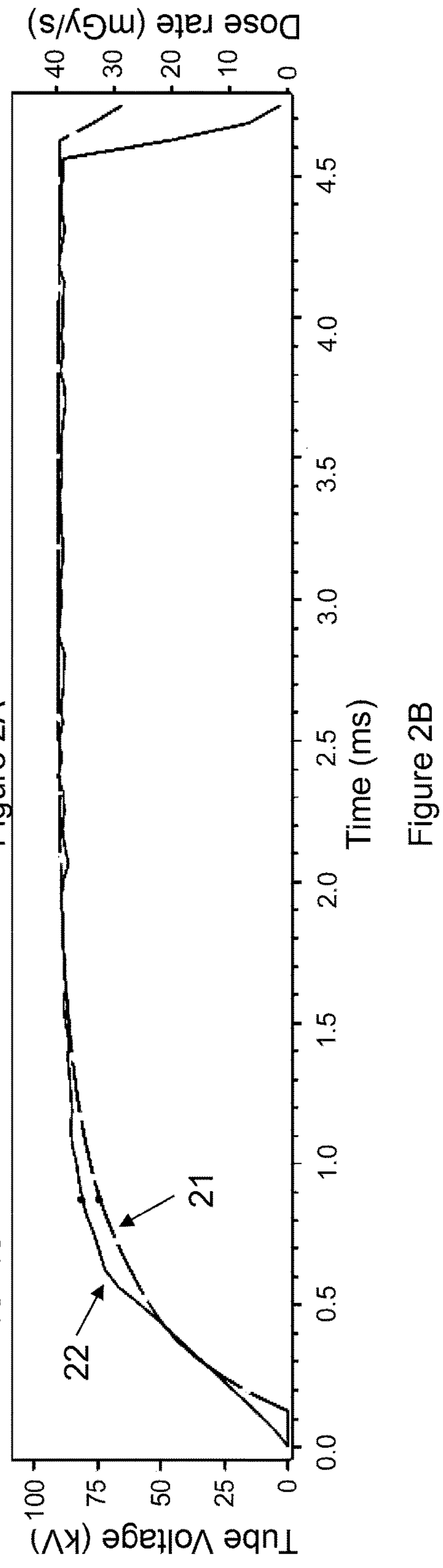

FIGS. 2A and 2B shows a demonstration of RF modulated X-ray radiation from a single tube. The X-ray radiation was measured by two devices simultaneously, a micro-channel plate (MCP) detector and a Raysafe dose detector. The MCP directly measures the x-ray radiation and coverts the radiation into an electron current with a gain of approximately 10,000. The electron current is passed through a 50 Ohm matching circuit and the voltage signal proportional to the X-ray radiation intensity was measured with oscilloscope. FIG. 2A shows the screen capture from the oscilloscope. The top image shows a screen capture 13 from a four-channel oscilloscope measurement of the MCP output voltage 14, the RF power input to the X-ray tube 15, and the RF power reflected from the tube 16. The RF signal 15 exists before a bias voltage is turned on (pulse start trigger signal 17), and once the bias voltage is turned on (at time point 19), the RF signal adds to the bias voltage and produces RF modulated X-ray radiation. Zoomed in portion 20 clearly shows a modulated signal 14 from the MCP detector at 3.6 MHz.

In FIG. 2A, the x-ray intensity signal measured by the MCP 14 is clearly the same frequency as the input RF signal 15 with a small phase offset between the two signals. The phase offset is due the distance between the RF input and the location of the MCP plate detector. The reflected power 17 reduces when the emitter is turned on by the addition of a bias voltage 19 to the input RF signal. The reflected power 17 is approximately a third of the input power, indicating that the majority of the RF signal is translating directly into an electron current and the phase offset between input and reflected power verifies that the RF signal is becoming current.

FIG. 2B shows an independent measurement of X-ray radiation using a Raysafe dose detector. The Raysafe detector has a maximum speed of lms and thus the RF signal is aliased out, however FIG. 2B clearly shows the tube voltage signal 21 and dose rate signal 22 at the same time as the MCP detector measured the RF modulated X-ray signal, independently confirming that X-rays were being generated by the X-ray tube. The device demonstrated in FIG. 2, added a bias current to RF input signal 15 so that the x-ray tube is continuously producing x-rays, but the intensity of the x-rays is modulated by the RF input signal 15. The bias voltage could be adjusted so that x-rays are only produced for some portion of the RF signal with the field emission device turning on and off by the RF pulse and the x-ray signal turning on and off based on the RF frequency.

The X-ray signal at any location in front an X-ray tube will be dependent on the intensity of the X-ray production, the distance from the X-ray tube, and the time of the measurement. In conventional X-ray tubes the time factor is binary; the X-ray pulse is either on or off and the X-ray signal exists or does not based on the pulsing of the tube. In an RF modulated X-ray signal, the time factor is based on the RF frequency and the distance from the X-ray source. In contrast to a conventional constant X-ray source, the distance will result in the normal one over distance squared loss and a phase offset to the intensity of the signal. The phase of the modulated X-ray signal is based on the frequency of the RF input and the distance from the input to the sample location. This offset in phase is shown in the MCP measurement 14 in FIG. 2A compared to the input signal 17.

If multiple field emission-based X-ray focal spots are simultaneously activated with the same RF input signal, the RF modulated X-ray signals will interfere with each other. At any given point in time and location, the X-ray signal will be the sum of the individual X-ray signals at that point in time and space. The sum of the individual X-ray signals will depend on the phase, frequency, and amplitude of each of the individual X-ray signals. The x-ray signal intensity at any given point in space and time can be defined in the equation (1):

$$\text{Intensity}(l_{(x,y,z)}, t) = \sum_N I_{n,d(x,y,z)} \cdot \sin\left(\frac{2\pi}{\lambda} d_{n,(x,y,z)} - 2\pi f \cdot t + \varphi_n\right) \quad \text{Equation 1}$$

In equation (1) the X-ray intensity is defined for a location l in x, y, and z coordinates and a time t. The intensity is the sum of N individual RF modulated X-ray sources all modulated by frequency f. The distance from each individual X-ray source to the location l is given by the variable d. The peak intensity of each X-ray signal at the location d is given by the variable I; where I includes both the one over distance squared loss and any X-ray attenuation in the path from the X-ray source to the location l. A phase offset φ is based on the phase of the RF signal when the signal reaches the X-ray tube.

Based on equation (I), several embodiments of a beamforming apparatus (or device) are disclosed to shape the disruption of X-ray intensity in front of (or around) an array of individual X-ray sources. For the sake of simplicity, all these descriptions represent the intensity I as uniform. The intensity I will vary depending on the distance from the array of X-ray sources and the X-ray attenuating material in the region between the X-ray sources and the locations described herein.

The beamforming apparatus may be multiple single beam X-ray tubes, a single multi-beam X-ray tube, or multiple multi-beam tubes. In a single beam X-ray tube, a single field emission source (comprised of multiple field emitters on a substrate), electrode structure, and an anode are housed in a single vacuum housing, and act as a single source of X-rays. In a multi-beam tube, multiple field emission sources. In one embodiment a multi-beam tube comprises multiple field emission sources located on the same physical substrate, each of which are electrically insulated from adjacent sources, and each receiving an independently controllable input signal. The target anode may comprise multiple target anodes (1 to 1 mapping of field emission sources to target anodes—ie one per beam), or a single target anode in which each electron beam is focused on a different spot to generate multiple X-ray sources from a single target anode. A single (or common) electrode structure may be used for generating electrons from multiple field emission sources, or multiple electrode structures may be used. The electrode structure may be a tetrode structure. In some cases some components of the electrode structure may be shared between the different field emission sources (for example a common grid, and/or a common focussing electrode could be used). The substrate, electrode structure(s) and anode(s) are housed within a single vacuum enclosure (ie a single tube). In another embodiment a multi-beam tube is a single vacuum housing comprising multiple separate field emission sources (ie separate substrates/cathodes) with separate electrode structures (which may share some components). Again either multiple target anodes (ie 1:1 mapping), or a single anode target (with multiple focal spots) may be used.

Several embodiments will now be discussed for implementing a range of beamforming patterns. These embodiments include multiple single beam sources and multibeam sources. In some embodiments the at least three field emission electron sources are spaced apart at a spacing of less than a quarter wavelength of the RF source.

Figure 3:
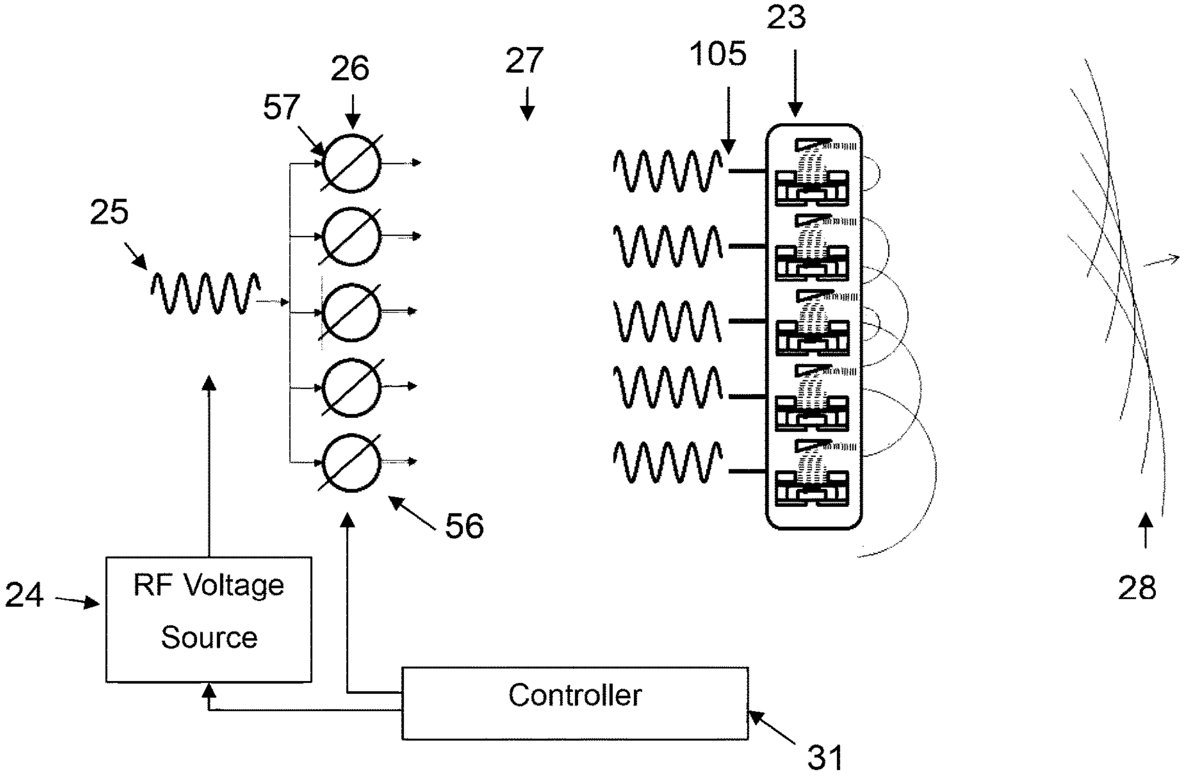
FIG. 3 is a schematic diagram showing a phased time delay applied to a RF carrier signal input to an array of RF modulating X-ray tube(s) such that the RF modulated X-ray signals overlap to create a spatially coherent wave front.
Figure 4:
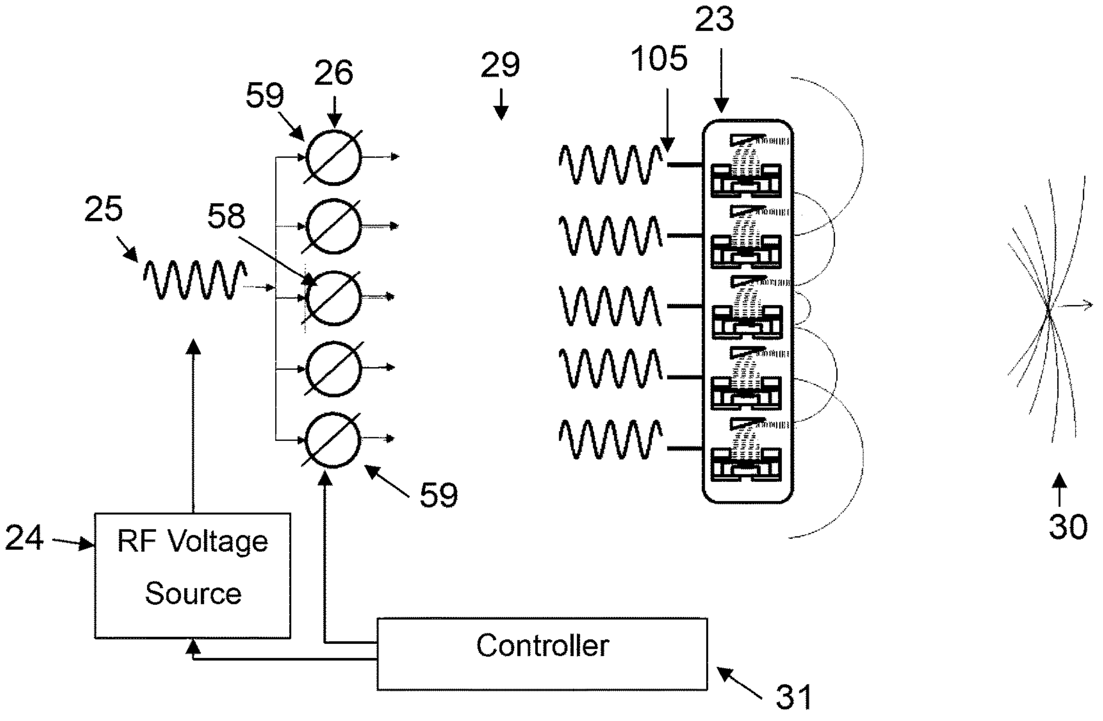
FIG. 4 is a schematic diagram showing a phased time delay applied to a radio frequency carrier signal input into an array of RF modulating X-ray tube(s) such that the RF modulated X-ray signals overlap to create a spatially coherent focal point.

In FIG. 3 and FIG. 4, a set of field emission based X-ray sources are arranged to create an array of RF modulating X-ray radiation sources 23. In this embodiment each of the field emission based X-ray sources are located within a common vacuum housing and each field emission based X-ray source comprises a field emission source (comprising a plurality of field emitters), an associated electrode structure to generate an electron current/beam and an anode which generates X-rays (from the beam). An RF source 24 generates a single RF voltage signal 25 which is applied to all of the array inputs via controlled phase delay blocks 26. This independently controlled phase delay input to each input voltage signal to each X-ray source results in a relative phase angle difference 27 between each element in the X-ray source array. The difference in phase of the RF X-ray radiation signals from multiple sources will cause the RF X-ray radiation to overlap in specific ways at specific locations away from the source. The location and shape of the overlapping radiation is defined by equation (1).

In FIG. 3, a phase delay 27 weighted (or biased) in one direction is applied to the different RF modulating X-ray sources 23 via an RF matching circuit 105. By applying a phase delay that slowly increases in one direction along the array, a narrow wavefront 28 is formed where the RF X-ray signals overlap away from the source. This wavefront will travel through space. At least three RF modulated X-Ray transmitters are desirable to form this wavefront. As more transmitters are added, the wavefront becomes narrower and more well-defined. By altering the specific distribution of the phase delay between each X-ray source, the direction of the wavefront can be altered. The magnitude of this wavefront relative to the background radiation is proportional to the number transmitters. As the number of X-ray sources increases, this wavefront becomes more distinguishable from the background radiation.

In FIG. 4, a phase delay weighted to a centre element 29 is applied to different RF modulating X-ray sources 23 via an RF matching circuit 105. By applying a centred phase delay, an X-ray focal point is created 30 where the RF X-ray signals overlap away from the source. This is not a typical X-ray focal spot on the surface of the target material where the X-rays are generated. This is an X-ray focal point in space that can be located in the middle of an imaged object. This point will move through space as the RF X-ray signal travels through space. At least three RF modulating X-Ray sources are required to form this point. By increasing the number of transmitters, the intensity of this spot relative to the background radiation 16 increases. By altering the phase difference between the different X-ray sources, the location of the X-ray focal point can be moved through space.

The two devices described in FIGS. 3 and 4 are similar to those used for beamforming of electromagnetic radiation. Beamforming is an established signal processing method where multiple transmitting elements transmit the same signal with a phase difference between them to form differently shaped beams. Beamforming signal processing is widely used in radar, ultrasound, lasers, and communications. The difference between these devices and typical beamforming devices is the application of an RF modulating X-ray source. The X-ray radiation will only interfere constructively following equation (1). This means that the signal will not cancel itself out at any point but will only add to increase signal at specific locations. Based on the similarity of these devices to electromagnetic beamforming devices, the term beamforming will be used from here on to describe the shaping of the X-ray intensity in space and time based on equation (1).

In FIG. 3 and FIG. 4, an RF controller 31 is configured to implement the predefined beamforming radiation pattern by controlling operation of the RF source and the array of phase delay elements. (The controller 31 will be explained in more detail in relation to FIG. 8.)

Figure 5:
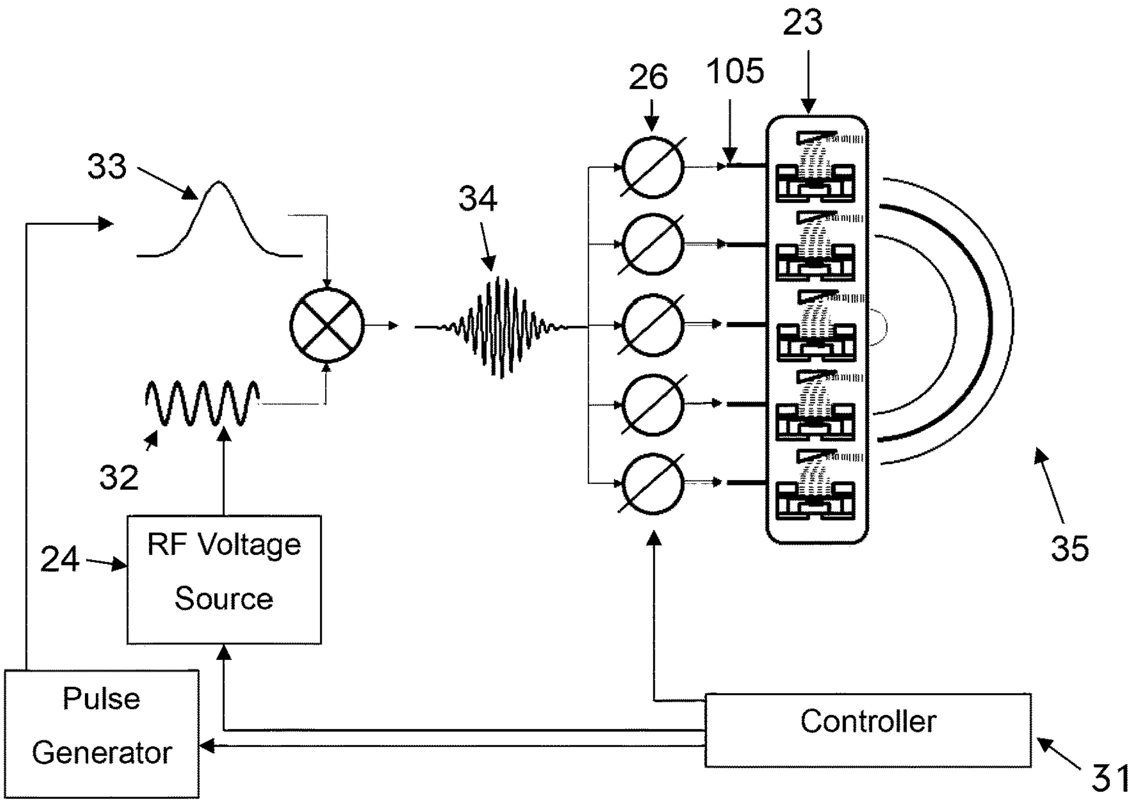
FIG. 5 is a schematic diagram showing a Gaussian pulse being combined with an RF carrier signal to create an amplitude modulated RF signal that is phase time delayed and input into an array of RF modulating X-ray tube(s)

In FIG. 5, the input RF voltage signal 32 from the RF source 24 is modulated with a single Gaussian pulse 33 from a pulse generator 34 to form an amplitude modulated RF voltage signal 32. This amplitude modulated RF voltage signal can then be phase delayed 26 and input in an array of RF modulating X-ray sources 23 for beamforming via an RF matching circuit 105. The amplitude modulated RF voltage signal will result in an amplitude modulated RF X-ray signal transmitted from each X-ray source in the X-ray. In FIG. 5, for clarity, only a single amplitude modulated RF X-ray signal from a single array element 35 is shown.

The amplitude modulated RF X-ray signal will look like a conventional X-ray broad spectrum signal travelling through space at the RF frequency, but will only have full intensity for a period of time defined by the parameters of the Gaussian pulse. The location of the peak intensity as it travels through space can be used to provide additional information about the depth of the RF X-ray signal or the time of flight of the X-ray signal travelling through space. When combined with the beamforming methods, the Gaussian pulse can be used to create a single peak wavefront or a single peak focal point travelling through space. This modifies the intensity of the X-rays defined in (1) with a Gaussian pulse as define in the equation (2); where σ is the standard deviation of the Gaussian pulse and $t_0$ is the reference time of the Gaussian pulse.

$$\text{Intensity}(l_{(x,y,z)},t)=\Sigma_N I_{n,d(x,y,z)}\cdot e^{-(t-t_0)^2/2\sigma}\cdot \sin(2\pi/\lambda d_{n,(x,y,z)}-2\pi f\cdot t+\varphi_n) \quad \text{Equation 2}$$

A Gaussian pulse is shown in FIG. 5 and described in (2) because a Gaussian is a commonly used in other beamforming applications. However, the pulse shape could be any definable shape including (but limited to) a rectangle or another sinewave at lower frequency. Equation 2 is further boarded to describe any time-based modulation added to the input signal in Equation 3; where P(t) is a time-based pulse signal.

$$\text{Intensity}(l_{(x,y,z)},t)=\Sigma_N I_{n,d(x,y,z)}\cdot P(t)\cdot \text{in}(2\pi/\lambda d_{n,(x,y,z)}-2\pi f\cdot t+\varphi_n) \quad \text{Equation 3}$$

Figure 6:
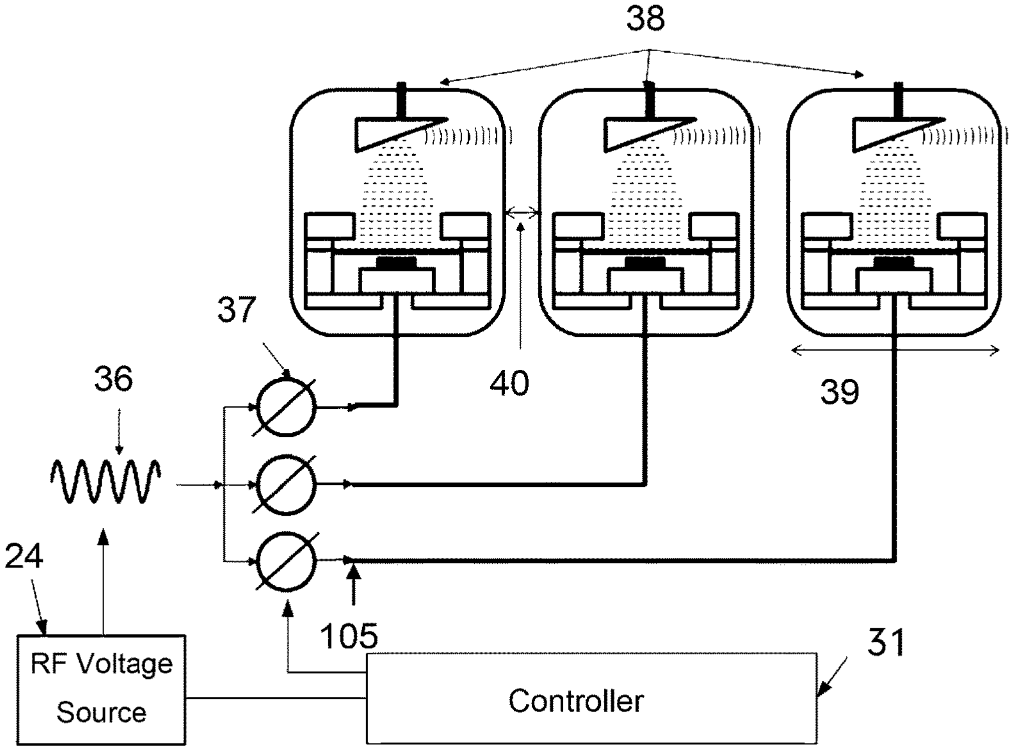
FIG. 6 is a schematic diagram showing an array of RF modulating X-ray tubes based on a set of three single source RF modulating X-ray tubes, where all three tubes are connected to a common input RF signal and phase delay structure.

The beamforming methods discussed thus far require an array of RF modulating X-ray sources. This array can be constructed using an array of individual field emission RF modulating X-ray sources (ie single beam source) as shown in FIG. 6. In FIG. 6, a single RF voltage signal 36 is phase or time delayed 37 and input into the three field emission based RF modulating X-ray sources 38. The three sources shown in FIG. 6 could be expanded to an array of user defined X-ray sources. The distribution of the X-ray sources is only limited by the size of each X-ray source 39. The spacing between the sources 40 can vary depending on the beamforming wave shapes a designer intends to create and the RF frequencies envisioned for the design. In some embodiments the sources are spaced apart at a spacing of less than a quarter wavelength of the RF source.

A simpler way to create an array of RF modulating X-ray sources is to use a field emission multibeam X-ray tube. Field emission based multibeam X-ray tube use the cold cathode property of the field emission electron emitters to package multiple field emission sources (or multiple independent field emitter regions) within a single vacuum enclosure. In these sources, the target can be either a single long bar of heavy metal held at the high voltage potential or as a distributed array of targets each held at the same high voltage potential. By packaging the array of X-ray sources within a signal vacuum tube enclosure, the distance between individual field emission sources can be minimized.

Figure 7:
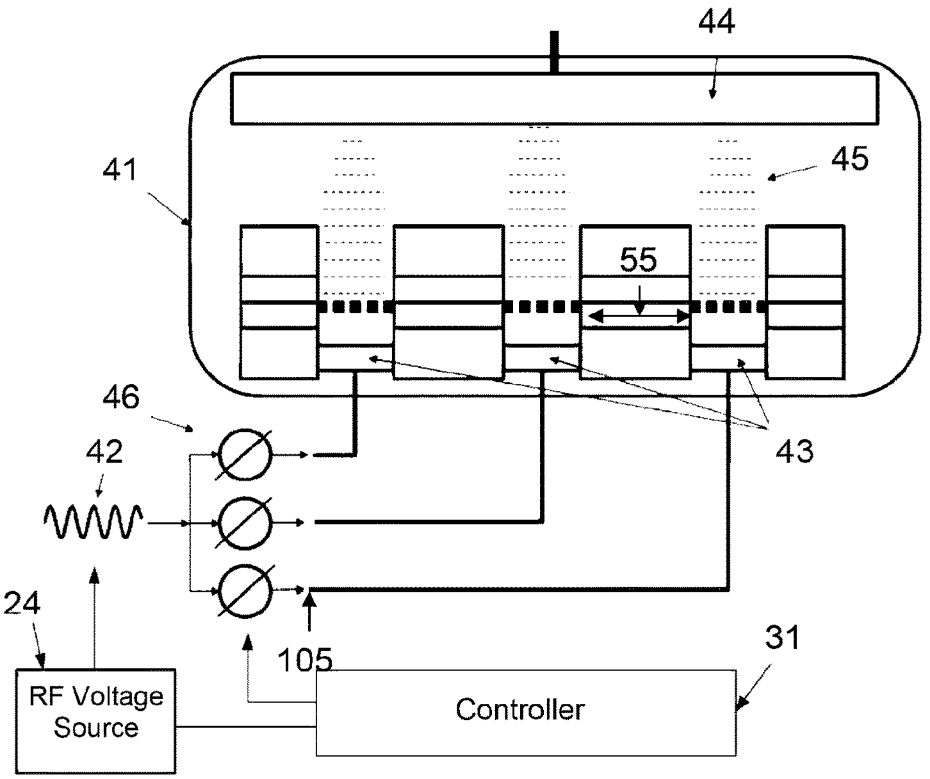
FIG. 7 is a schematic diagram showing an array of RF modulating X-ray tubes based on a single multibeam X-ray tube.

In FIG. 7, a field emission based X-ray multibeam tube 41 is used as the array of RF modulating X-ray sources. A single RF voltage signal 42 is phase or time delayed 33 and input as the voltage signal to drive the electron emitter 43 for each X-ray source via an RF matching circuit 105. A single long heavy metal target anode 44 is held at potential to accelerate the electrons 45 to produce X-rays. The phase time delay 46 can be adjusted to form the wave front or RF modulated X-ray focal point. The example multibeam tube shown in FIG. 7 has only three field emission sources (field emitters) for simplicity of explanation. Field emission based X-ray multibeam tubes have been design with hundreds of individual emitters packaged in single vacuum tube enclosures. An array with a user defined number of RF modulated X-ray source elements can be created using multibeam X-ray tubes.

Field emission based X-ray multibeam tubes have also been designed with a variety of shapes; some examples include linear arrays, arcs, and two dimension distributions of emitters (or distinct sources). In beamfonning signal processing a wide variety of antennae arrays are used depending on the application. These arrays includes one and two dimensional arrays, linear and curved arrays, arrays with linearly spaced transmitting elements, and arrays where the spacing is non-linearly biased in some way to contribute to the beamforming. The flexibility of field emission based X-ray multibeam tubes can be used to design an array of RF modulating X-ray sources using any of the existing RF antennae array concepts previously listed. In some cases, these RF modulating X-ray arrays can be constructed with individual field emission X-Ray sources instead of multibeam tubes. The principle advantage of a multibeam field emission X-ray tube is the ability to achieve a much smaller spacing between RF modulating X-ray sources.

The RF source and RF controller apparatus is configured to generate a plurality of individually controlled phase delayed RF signals, each of which drive one of the at least three field emission electron sources(via the RF matching circuit) in order to implement a desired predefined beamfonning pattern. In most embodiments the RF source and RF controller are external to the vacuum housing(s). In one embodiment the RF source is configured to supply an RF control signal to an array of phase delay elements, and the controller implement the predefined beamfonning radiation pattern by controlling the operation of the RF source and the array of phase delay elements. The RF controller may be general purpose processor system which interfaces with the RF source and controls one or more circuit components to control the generation of the individual phase delayed RF signals.

Figure 8:
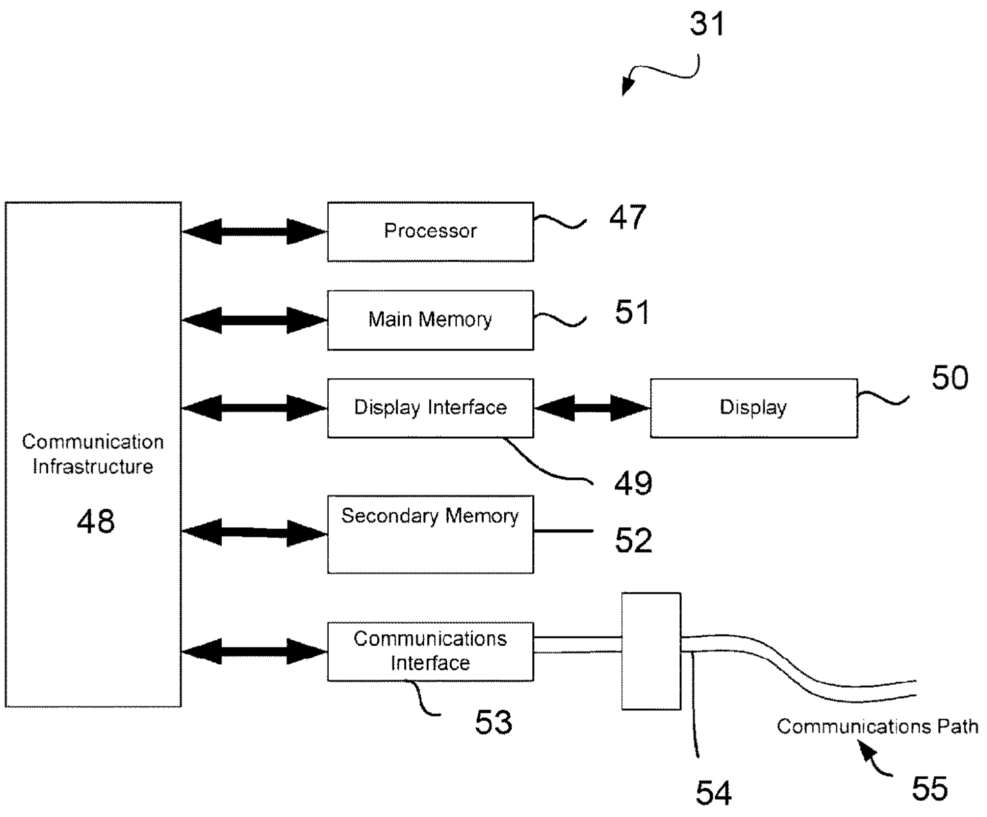
FIG. 8 is a schematic diagram of a controller configured to implement a predefined beamforming radiation pattern by controlling operation of the RF source and the array of phase delay elements.

A detailed view of an embodiment of the RF controller 31 is shown in FIG. 8. The controller 31 includes one or more processors, such as processor 47. The processor 47 is connected to a communication infrastructure 48. The controller 31 may include a display interface 49 that forwards graphics, texts and other data from the communication infrastructure 48 for supply to a display unit 50. The controller 31 may also include a main memory 51, preferably random access memory, and may also include a secondary memory 52. The controller 31 may also include a communications interface 53 to allow software and data to be transferred between the controller 31 and external devices. In particular, the communications interface 53 enables the controller 31 to control the X-ray radiation sources, the radio frequency source amplitude, and the array element phase delays.

Examples of communication interface 53 may include a modem, a network interface, a communications port, a PCMIA slot and card etc. Software and data transferred via a communications interface 53 are in the form of signals 54 which may be electromagnetic, electronic, optical or other signals capable of being transmitted and received by the communications interface 53. The signals are provided to communications interface 53 via a communications path 55 such as a wire or cable, fibre optics, phone line, cellular phone link, radio frequency or other communications channels.

In this example the controller 31 is a software based system in which the memory stores software instructions for implementing one or more beamforming patterns in the form of instructions which cause one or more hardware components to generate the plurality of phase delay signals from the RF source in order implement the desired beamforming pattern. The memory may comprise additional software for controlling the RF source, and high voltage sources. In other embodiments the RF controller is a microcontroller or general purpose microprocessor, a digital signal processor (DSP), an application specific integrated circuit (ASIC), a field programmable gate array signal (FPGA) or other programmable logic device (PLD), hardware state machine, discrete gate or transistor logic, discrete hardware components or any combination thereof. The RF controller may be a software defined radio arrangement configured to generate the plurality of phase delay signals from the RF source in order implement a desired (ie predefined) beamforming pattern. Alternatively the RF controller may be configured as a hardware circuit with appropriate circuit elements configured to generate the plurality of phase delay signals from the RF source in order implement a desired beamforming pattern. In other embodiments, the invention may be implemented using a combination of both hardware and software.

In one embodiment the RF source has a frequency of at least 1 MHz and preferably is a VHF source with a frequency of at least 100 MHz source (3 m wavelength), and even more preferably is at least a 1 GHz source (30 cm) or higher (eg 3 GHz=10 cm). Beyond around 100 GHz (3 mm) the wavelength becomes small and the RF controller and RF matching circuits need to be carefully designed (driving up the cost of manufacture).

Examples of how an input RF signal 25 may be delayed to induce a phase shift 26 include a constant spacing is applied between individual tubes 30 shown in FIG. 6 or between individual field emission sites 55 in a multibeam tube shown in FIG. 7. In this configuration, the signal 36 is fed directly to each of the field emission sites and the phase delay is created by the time taken for the signal to travel the distance 30,55 to each subsequence X-ray source. In this case, $\varphi$ in equations (1), (2), and (3) is a single fixed value for all n X-ray sources. The resulting wavefront 28 will have a fixed angular direction dependent on the distance 30,55 and the wavelength of the RF signal 32.

A second example of a method to apply phase delay 26 to an input RF signal 25, is to have fixed path lengths to each X-ray source. The length of the path induces a phase delay 29 to the input RF signal 32. In the FIG. 3, the bottom element 56 will have the shortest path length; the path lengths will increase with the longest path being used for the top element 57. In FIG. 4, the middle element 58 will have the longest path lengthen; the path lengths will equal extend on either side of the centre with the two on the ends having the shortest paths 59. A person skilled in the relevant art will recognize that the path lengths delays should be based on the wavelength and the predefined phase delay to shape the transmitted RF modulated x-ray signal.

A final example of a method to apply phase delay to an input RF signal, uses nonnalised gain phase delay circuits with phase-gain networks and an op-amp to apply a fixed phase delay to a signal passing through the circuit. The RF equivalent of this exists for RF frequencies into the GHz range. A person skilled in the relevant art will recognize these circuits as a simple example of phase delay circuits and other more sophisticated phase delay circuits exist for a range of beamforming applications. Each of these may be applied to the invention.

The examples of phase delay discussed so far are fixed phase delay methods that result in a single shape beamforming from the X-ray sources coupled to the phase delay. By switching the RF paths of the delayed signals to the sources, alternative beamforming patterns can be obtained without changing the physical arrangement of the array. The basic concepts used for the fixed beamforming methods can be extended to cover continuously variable patterns by substituting the fixed phase delay blocks with variable phase delay blocks.

Figure 9:
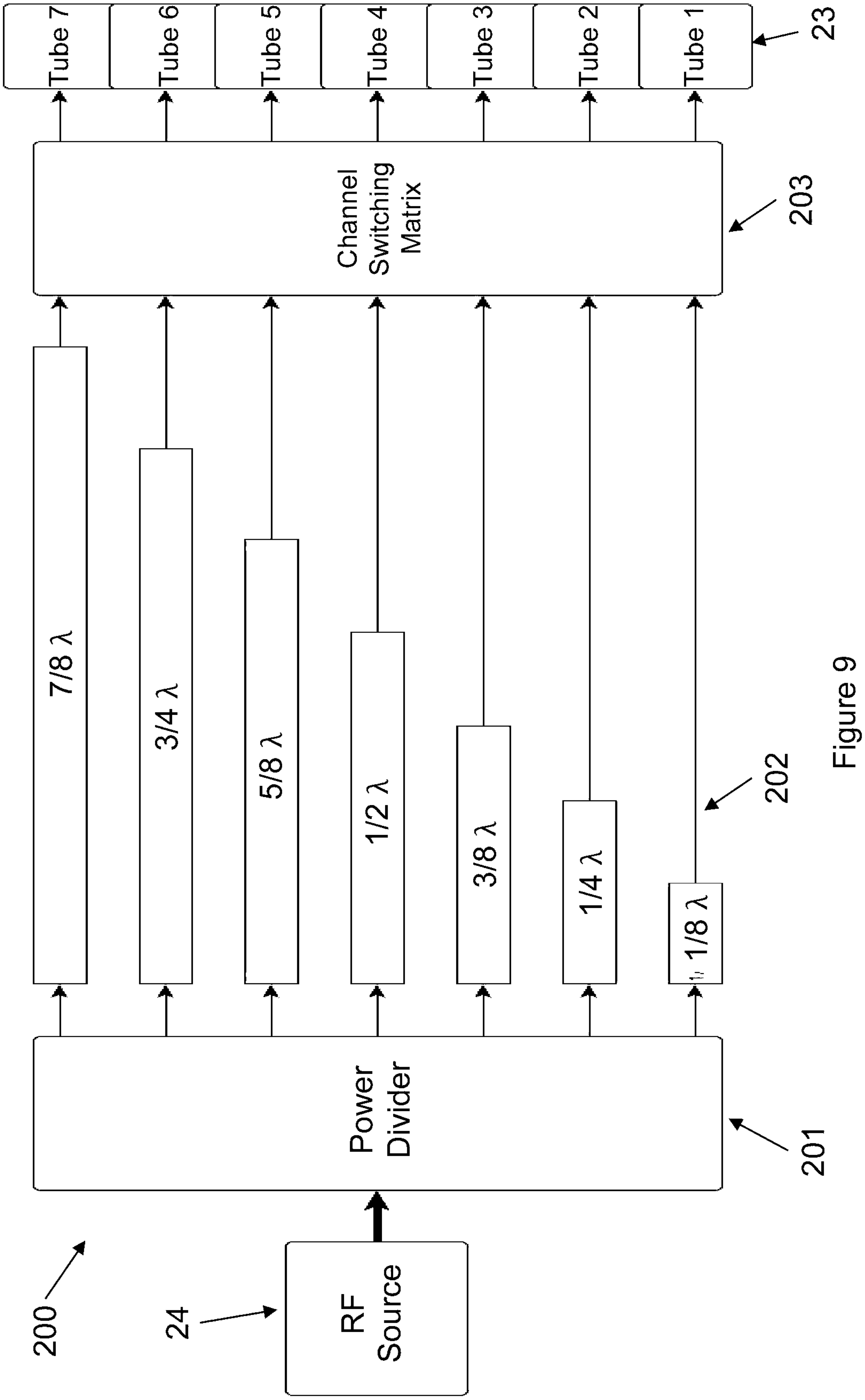
FIG. 9 is a schematic circuit diagram of a RF phase delay circuit according to an embodiment.

FIG. 9 is a schematic circuit diagram of a RF phase delay circuit 200 according to an embodiment. The RF Source 24 is input to a power divider 201 which splits the input RF signal into seven paths each with a fixed phase delay element 202. In this embodiment the phase delay elements 202 are ⅛ wavelength ($\lambda$) increments (phase offsets) generating ⅛$\lambda$, ¼$\lambda$, ⅜$\lambda$, ½$\lambda$, ⅝$\lambda$, ¾$\lambda$, and ⅞$\lambda$ paths. In one embodiment the fixed phase delay elements each comprise fixed length coaxial delay lines (or cables) that allow generation of seven discrete phase delayed signals, each of which is mapped to one of seven field emission tubes 23 via a channel switching matrix 203 under control of the controller 31 to implement the desired beamforming pattern.

It will be appreciated that one or more embodiments of the invention provide a device and method for using beamforming signal processing to form, steer, and focus RF modulating X-Ray radiation using an array of field emission X-ray sources.

In one or more embodiments, a subset of three or more RF modulating field emission-based X-ray sources is modulated with the same RF signal with some phase offset between the signals. The phased offset signal results in a frequency dependent time delay between the transmitted RF X-ray signals emanating from these different sources. This phase offset is preserved as the X-ray signals propagate through space and the imaged object.

In one or more embodiments, a phased time delay is applied across a set of RF modulating X-ray sources such that the resulting RF X-ray signals are overlapped to create a spatially coherent wave front. This wave front can be steered through the imaged space by altering the phased time delays applied to the set of transmitters. By altering the RF modulating frequency and number of RF X-ray sources contributing to form the wave front, the length and width of the wave front can be modified.

In one or more embodiments, a phased time delay is applied across a set of RF X-ray sources such that the resulting RF X-ray signals are overlapped to create a spatially coherent focal point. This focal spot can be steered through the imaged space by altering the phased time delays applied to the set of X-ray sources. By altering the RF modulating frequency and the number of RF modulating X-ray sources contributing to the focal point, the size and relative intensity of the focal point can be adjusted.

In one or more embodiments, a pulse, having a Gaussian, Nyquist or other suitable form, is overlapped with the RF modulating signal and delivered to the RF modulating X-ray sources, which are then phased delayed to form a wave front or a focal point. The pulse travels with the RF X-ray signals as an amplitude modulation to provide depth information to the RF modulated X-ray signal.

In such embodiments, the set of RF X-ray sources are arranged as an array. This array of sources maybe arranged in one or two dimensions. The spacing within this array may be even linear spacing or biased to be related to the wavelength of the modulating RF signal. To create this array of RF modulating X-Ray sources, a single field emission multibeam tube maybe used as the array, or a set of field emission x-ray tubes may be arranged as an array, or a set of multibeam tubes maybe arranged as a sequence of arrays.

The disclosed invention describes a device and a method for shaping the distribution of X-ray intensity in time in the space beyond the X-ray tubes. The X-ray is concentrated in either a narrow wavefront (FIG. 3) or a consolidated spot (FIG. 4) traveling through space and time. Such a device has a variety of applications, including measuring X-ray scatter and radiation beam treatment.

X-ray scatter occurs when the x-ray photons are deflected from their linear path between the x-ray tube and detector. X-ray photons can scatter in all directions, but the direction and the energy of the scattered photons is related to the chemical elements the X-ray photon is scattering off. In most medical, security, and non-destructive testing, X-ray scatter is considered noise and suppressed in the measured X-ray signal. Some systems directly measure the x-ray scatter to better differentiate objects in the X-ray scan; however, such systems need to strictly define the x-ray signal paths to identify where the X-ray scatter signal is originating.

X-ray backscatter imaging is one example of strictly defining the X-ray paths; in backscatter imaging a narrow X-ray pencil beam is rastered over the object of interest and X-ray scatter generated along the pencil beam is collected. The collected X-ray signal is assigned to an image pixel corresponding to the location of the narrow pencil beam. X-ray backscatter can be configured to target a set depth in the object by adding collimation to the detector so that the collimation paths and the pencil beam paths cross inside the object. In this method, the resolution is limited by the collimation of the x-ray tube and detectors. Collimation is very lossy method of controlling the X-rays because the majority of X-ray power is lost to the collimators.

Applied to x-ray backscatter, the disclosed invention provides a method for moving a narrow beam 28 of x-rays through an imaged object without collimation. In such an application, x-ray scatter is highest at the location of the narrow beam 28. The narrow beam moves through the object based on the wavelength of the RF signal; thus, the time of the backscatter signal will correspond to the location of the scatter in the object. This application could significant increase the efficiency of a backscatter imaging systems due to the lack of a collimator.

X-ray diffraction imaging is another example of strictly defining X-ray paths; in diffraction imaging narrow X-ray pencil beams are rastered over the object of interest and collimated X-ray energy sensitive detectors collect the forward scattered X-rays. The location of the X-ray scattered photons is identified by the location of the X-ray beam and the collimation path. The energy of the X-ray photons and the location of the scatter enable the unique elemental identification of the scanned objects.

Applied to X-ray diffraction, the disclosed invention provides a method of concentrating the x-ray signal in a single point in time and space. Rather than creating a series of points using overlapping collimators, the disclosed invention enables the points to be created by adjusting the phase delays and frequencies of the X-ray signal. This application could significant increase the efficiency and decrease the size of X-ray diffraction.

X-ray coherent scatter imaging is another example of strictly defining X-ray paths; in coherent scatter imaging, a coded aperture is placed between the X-ray source and object and between the object and the detector. In coherent scatter imaging, the spatial distribution of the scatter is reconstructed based on the coded apertures; the spatial distribution of the scatter is used to uniquely identify the materials causing the X-ray scatter. The coded apertures are basically very sophisticated collimators.

Applied to X-ray coherent scatter imaging, the disclosed invention provides a method of spatially concentrating the X-ray signal in a single point in time and space. The spatial distribution of X-ray scatter, measured at a specific point in time, corresponds to the location of the single point. This application could significant increase the efficiency and decrease the size of X-ray coherent scatter imaging.

In all the described X-ray scatter measurements, the x-ray detector must have a very high sampling rate to capture RF modulated X-ray signals. At present no such X-ray detector is known to exist. However, detecting, filtering, and amplifying RF modulated electronic signals is a well-established technology. A device is required to convert the X-ray photons into an electronic signal. Such direct conversion devices exist; however, these devices typically avalanche the electronic signal to amplify it. The avalanche of electrons requires a reset of the device which slows the response time of the detector. A direct conversion device that does not avalanche and provides a constant electronic signal is required for all the described applications.

In all the described X-ray scatter measurements, the processing of the RF modulated x-ray signal is very complex. The X-ray scatter signal is embedded in the time, phase, and amplitude of the received RF X-ray signal as shown in equation (1). Additionally, the X-rays are concentrated in a narrow spot, but x-rays are traveling through all of space at a lower intensity. The lower intensity signal needs to be filtered out of the measured signal to draw out the X-ray scatter signal. The lower intensity signal also has valuable information about the general shape and density distribution of the image object, so this information should be process separately. To accurately use the full RF modulated X-ray signal, the equation (1), (2), or (3) will need to be reconstructed for all points of interest; where the points are both in three-dimensional space and in time. This reconstruction is a time varying computed tomography reconstruction. No such algorithm currently exists; however, the building blocks for this algorithm exists in the computed tomography imaging domain and in the research done on X-ray scatter modelling.

Another application of disclosed device is radiation treatment. In radiation treatment a cancerous mass is exposed to a high dose of ionizing radiation to kill the cancerous tissue; however, the surrounding tissue receives and equally high dose. Applied to radiation treatment, the disclosed invention could reduce the dose the surrounding tissue receives and concentrate the dose at centre of the cancerous tissue. In this application, the average dose received by most tissue is lower without reducing the total dose delivered to the cancerous tissue. This could reduce the probability of healthy tissue death.

Systems and methods have been described that are configured to modulate X-ray radiation sources to generate beamformed X-rays. These can operate at lower frequencies and are simpler and more compact than existing backscatter or X-ray RADAR systems. The use of beamforming enable tighter directional control and focussing of X-rays enabling applications such as higher resolution imaging and radiation therapy.

Throughout the specification and the claims that follow, unless the context requires otherwise, the words “comprise” and “include” and variations such as “comprising” and “including” will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. An X-ray radiation beamforming apparatus, including:

at least three field emission electron sources and one or more associated electrode structures housed in one or more vacuum enclosures;

a radiofrequency (RF) source and an RF controller configured to produce a plurality of individually controlled phase delayed RF signals;

an RF matching circuit configured to match each of the at least three field emission electron sources with one of the plurality of individually controlled phase delayed signals to generate a plurality of RF modulated electron currents at the same frequency and phase delay of each of the plurality of phase delayed RF signals;

one or more target anodes housed in the one or more vacuum enclosures, wherein a voltage potential between the one or more target anodes and the at least three field emission electron sources accelerates the plurality of RF modulated electron currents to generate RF modulated X-ray radiation at the same frequency and phase delay of each of the plurality of phase delayed RF signals, and wherein the RF controller is configured to produce a plurality of individually controlled phase delayed signals to implement a predefined beamforming radiation pattern.

2. The apparatus as claimed in claim 1, wherein a frequency of the RF source is at least 100 MHz.

3. The apparatus as claimed in claim 2, wherein the frequency of the RF source is at least 1 GHz.

4. The apparatus as claimed in claim 1, wherein the at least three field emission electron sources are spaced apart at a spacing of less than a quarter wavelength of the RF source.

5. The apparatus as claimed in claim 1, wherein the predefined beamforming radiation pattern is a narrow X-ray wavefront travelling through space.

6. The apparatus as claimed in claim 1, wherein the predefined beamforming radiation pattern focuses the X-ray radiation to a single spatial location.

7. The apparatus as claimed in claim 1, wherein the RF source and the RF controller comprises an RF source configured to supply an RF control signal to an array of phase delay elements, and the controller implement the predefined beamforming radiation pattern by controlling the operation of the RF source and the array of phase delay elements.

8. The apparatus as claimed in claim 7, wherein the RF controller further comprises:

a pulse generator for modulating the RF control signal with a pulse to create a single-peak wavefront or a single-peak focal point travelling through space.

9. The apparatus as claimed in claim 7, wherein the RF source and the RF controller is configured to produce the plurality of individually controlled phase delayed RF signals by using a plurality of individually controlled phase delay circuits.

10. The apparatus as claimed in claim 7, wherein the RF source and the RF controller is configured to produce the plurality of individually controlled phase delayed RF signals by using a plurality of phase delay paths.

11. The apparatus as claimed in claim 7, wherein the at least three field emission electron sources are arranged in an array such that the spacing between each individual field emission electron source have a set phase shift along the array.

12. The apparatus as claimed in claim 1, wherein the one or more targets comprises at least three target anodes wherein there is a 1 to 1 mapping of a field emission electron source to a target anode, and the at least three target anodes are arranged in an array to generate an array of at least three RF modulated X-ray radiation sources.

13. The apparatus as claimed in claim 1, wherein the at least three field emission electron sources are arranged as a linear spaced array.

14. The apparatus as claimed in claim 1, wherein the at least three field emission electron sources are arranged as a non-linear biased spaced array where the bias is related to the wavelength of the modulating RF control signal.

15. The apparatus as claimed in claim 1, where the at least three field emission electron sources are arranged as multiple sets of arrays.

16. The apparatus as claimed in claim 15, wherein each set is a linear spaced array.

17. The apparatus as claimed in claim 15, wherein each set is arranged as a non-linear biased spaced array where the bias is related to the wavelength of the modulating RF control signal.

18. The apparatus as claimed in claim 1, wherein the at least three field emission electron sources are arranged as an array within a single vacuum enclosure configured as a single multibeam field emission X-ray tube that generates multiple RF modulated X-ray radiation sources.

19. The apparatus as claimed in claim 1, wherein the plurality of at least three field emission electron sources are each housed in at least three separate vacuum enclosures arranged in an array, and each configured as a single RF modulated X-ray radiation source.

20. The apparatus as claimed in claim 1, wherein the at least three field emission electron sources are arranged as an array of multibeam field emission X-ray tubes that generate multiple RF modulated X-ray radiation sources and each comprising a single vacuum enclosure housing an array of multiple field emission electron sources that each generate multiple RF modulated X-ray radiation sources.

21. A method for generating beamformed X-ray radiation, the method comprising:

generating a plurality of individually controlled phase delayed radiofrequency (RF) signals from a RF source and a RF controller;

applying each of the individually controlled phase delayed signals to each of at least three field emission electron sources using an RF matching circuit to generate a plurality of RF modulated electron currents at the same frequency and phase delay of each of the plurality of phase delayed RF signals;

accelerating the plurality of RF modulated electron currents towards one or more target anodes by applying a voltage potential between the one or more target anodes and the at least three field emission electron sources to generate RF modulated X-ray radiation at the same frequency and phase delay of each of the plurality of phase delayed RF signals, wherein the RF controller is configured to generate the plurality of individually controlled phase delayed RF signals to implement a predefined beamforming radiation pattern.

22. The method as claimed in claim 21, wherein the frequency of the RF source is at least 100 MHz.

23. The method as claimed in claim 21, wherein the at least three field emission electron sources are spaced apart at a spacing of less than a quarter wavelength of the RF source.

24. The method as claimed in claim 21, wherein the predefined beamforming radiation pattern is a narrow X-ray wavefront travelling through space.

25. The method as claimed in claim 21, wherein the predefined beamforming radiation pattern focuses the X-ray radiation to a single spatial location.

26. The method as claimed in claim 21, wherein generating a plurality of individually controlled phase delayed RF signals comprises:

splitting an RF control signal into a plurality of signal paths each connected to one of an array of phase delay elements;

sending, by the RF controller, a plurality of control signals to each of phase delay elements to implement a predefined beamforming radiation pattern.

27. The method as claimed in claim 21, wherein the one or more targets comprises at least three target anodes, wherein there is a 1 to 1 mapping of a field emission electron source to a target anode, and the at least three target anodes are arranged in an array to generate an array of at least three RF modulated X-ray radiation sources.

28. The method as claimed in claim 21, wherein the at least three field emission electron sources are arranged as a linear spaced array.

29. The method as claimed in claim 21, wherein the at least three field emission electron sources are arranged as a non-linear biased spaced array where the bias is related to the wavelength of the modulating RF control signal.

30. The method as claimed in claim 21, where the at least three field emission electron sources are arranged as multiple sets of arrays.

* * * * *